2,819,064

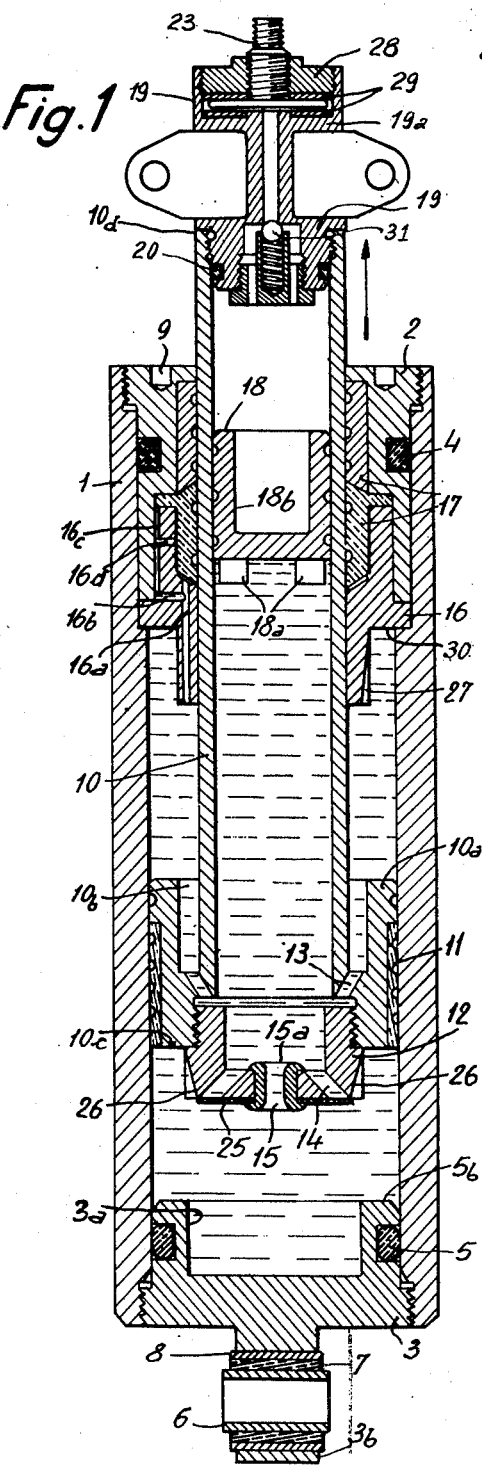
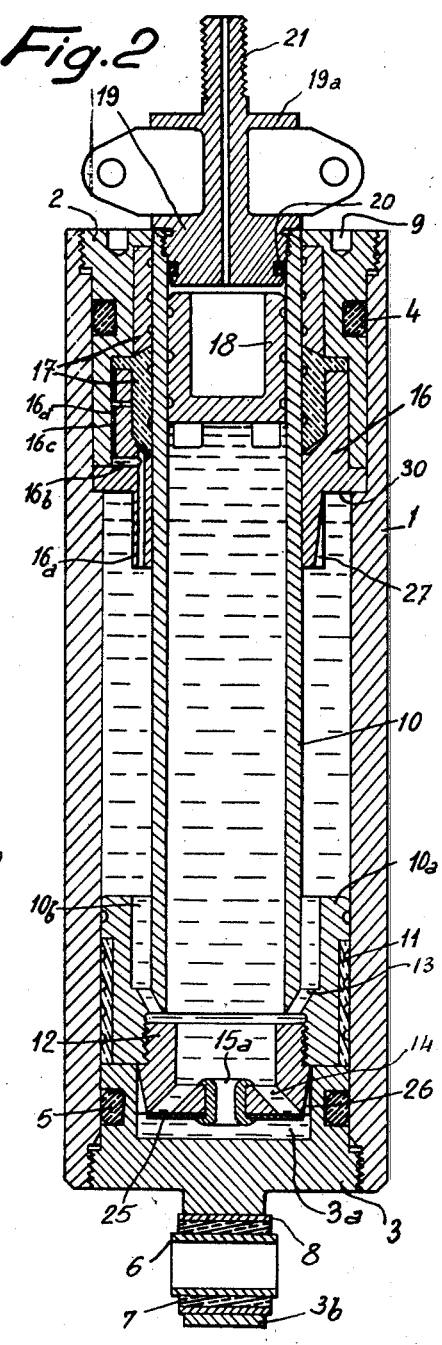

SUSPENSION DEVICES FOR VEHICLES

Lucien Jules Peras, Billancourt, France, assignor to Regie Nationale des Usines Renault, Billancourt, France, French works under the control and the authority of the French Government Application July 7, 1954, Serial No. 441,825

Claims priority, application France August 24, 1953

5 Claims. (Cl. 267—64)

The invention relates to suspension devices for vehicles and is more particularly concerned with improvements in the suspension device which is the subject of the patent application No. 373,639 of August 11, 1953, now Patent No. 2,756,989, dated July 31, 1956, in the name of the application company.

These improvements have as their object a constructional form wherein there may be grouped in one single assembly the different elements which formed the subject matter of the aforesaid patent and its addition and which comprise a member which may serve as a hydropneumatic spring, an automatic valve and a liquid container above which is provided a certain quantity of air whose pressure may be regulated at will; these members are connected by piping in this previous construction.

The concentration according to the new arrangement has the advantage of rendering the system independent to a certain extent, as well as being economical.

In the prior patent, the three elements could be located at different points of the vehicle, it being possible for the same container to serve for all the springs, or else a container was provided for each pair of springs mounted on the chassis, or else each container was allotted to one spring.

It is to this latter device that the invention particularly relates. It will be noted that the hydropneumatic spring-shock absorber may be employed in conjunction with a standard spring which brings to it (or to which it brings) an additional elasticity, the function of the hydropneumatic spring-shock absorber then being that of an overload compensating member, a role for which, as will be seen hereinafter, it is particularly suitable.

When it is used alone without being adjoined to an ordinary spring, the apparatus is called upon to perform the three following functions at the same time: as spring, shock absorber and overload compensator.

The accompanying drawings show by way of non-limitative example, one embodiment of the apparatus comprising the improvements which are the subject of the invention.

Fig. 1 is a vertical sectional view of the assembly of a shock-absorber spring represented in its mean position of equilibrium with normal load.

Fig. 2 is a sectional view of a similar assembly contracted as at the end of stroke, but intended to operate with an auxiliary container.

The outer casing 1, whose cross-section is suitably calculated to resist all stresses caused by the internal pressures which are developed, is closed at its extremities by two screw-threaded plugs 2 and 3, comprising two packing rings 4 and 5 in the form of fluid-tight rings and constructed of plastic material or of rubber, for example.

The plug 3 has a recess 3a whose function will be explained hereinafter.

The plugs 2 and 3 may be provided with blind holes such as 9 by which they can be secured or removed by means of a pin wrench. The lower plug is provided with a perforated appendage 3b in which are mounted two metal rings 6 and 8 with a member 7 of suitably hard rubber interposed therebetween; inside the hub 6 there extends the shaft, not shown, serving for fixing to the non-suspended part of the vehicle, the wheel hub for example.

A tubular element 10 terminates at its lower extremity in a piston 10a whose diameter corresponds to the internal diameter of the casing 1 and which is provided with a packing 11 with circular grooves facilitating lubrication.

This piston is completed by a hollow head 12 assembled by any suitable means (by screwing for example). The diameter and height of the head 12 are such that it can fit almost entirely into the recess 3a of the plug 3, as shown in Fig. 2. The piston 10a and the head 12 may also be made in one single piece, the whole assembly being fixed to the hollow element 10.

In the head 12 will be noted a system of radiating channels 13 which open into the annular space 10b between the piston 10a and the tubular element 10.

Two systems of communication are provided between the lower part and upper part of the head 12; these are firstly the radiating channels 14 (which are sealed by an elastic diaphragm 25) and a calibrated central orifice 15a formed in a member 15 which is crimped to the end of the head 12 and which at the same time holds in position the diaphragm 25.

The head 12 is also provided with grooves 26 of gradually decreasing cross-section, so that when the outer part of the head 12 penetrates into the recess 3a the liquid imprisoned escapes through the openings whose cross-section becomes progressively reduced as the head 12 moves further downwards. A gradual and very effective end-of-stroke abutment is thus provided.

The tubular element 10 slides at its upper extremity in a stuffing-box 17 held by an end ring 16, the whole being advantageously constructed in accordance with the arrangement provided in the applicant's French Patent No. 1,065,140. It will be recalled that the channels 16a, 16b, 16c and 16d formed in the part 16 serve to keep the packings pressed against the sliding element 10 and to prevent leakages. It will be noted that the channel 16a is here formed parallel to the general axis of the skirt portion of the part 16. This is necessary in order that when the bearing surface 30 of the part 16 comes to bear on the corresponding face of the part 10a, at the moment of maximum elongation, the opening of the channel 16a should not be blocked but remain in constant communication with the volume of oil by means of the vents 13 formed in the bottom of the recess 10b into which engages the skirt portion of the part 16.

The part 16, one portion whereof fits into the channels 10b during the maximum extension of the apparatus, is provided with grooves 27 which are of gradually decreasing cross-section and which play a role similar to that of the channels 26.

The element 10 is capped at its upper end with a stopper 19 comprising a packing ring 20. The top of this stopper 19 terminates either in a connecting member 21 (Fig. 2), enabling it to be connected by piping to an air cylinder, not shown, or else by a valve 23 (Fig. 1) making it possible to "inflate" the interior of the apparatus, the said valve being fixed in turn by a plug 28 and packing rings 29. In this case a ball valve 31 provides additional sealing and assists the valve 23. The hollow element 10 must be connected by means of its stopper 19 to the body of the vehicle which is being supported, for example at a support arm (not shown) which is mounted on a shoulder 19a by two half-collars.

Arranged within the hollow element 10 is a float member 18 which slides with slight friction within the said hollow element. It comprises abutments 18a and is made lighter by the cavity 18b.

Whereas the elements 1 and 10 may advantageously be made of a very strong metal, the float member 18 may be constructed of a material whose density is lower than that of the oil, for example of rubber of the neoprene type, of plastic, or of wood. It is not provided with any orifice for the passage of oil and it serves to separate the two media, liquid and gaseous, whose interaction provides the elasticity of the system and also prevents any injurious emulsion.

The spaces comprised between the casing 1 and the elements 10 and 10a and also the interior of the body 10 up to the float member 18, and the lower part of the cylinder 1 under the head 12, are completely filled with an appropriate liquid, silicone oil, whose properties ensure good shock absorbing and do not vary under the influence of temperature, pressure, humidity, age or chemical agents. The float member 18 prevents emulsion of the oil during use.

The system operates as follows:

When the piston 10a, starting from an intermediate position in the vicinity of that shown in Fig. 1 and which has been adjusted permanently by inflating at a suitable pressure the hollow element 10, approaches (owing to a shock travelling in an upward direction) the bottom at the end at which the plug 3 is located, the liquid is driven through the calibrated orifice 15 and cannot pass through the holes 14 which are sealed by the pressure applied by the liquid in an upward direction on the diaphragm 25. Therefore it passes wholly through the calibrated orifice 15a at a rate of flow which is necessarily limited.

The apparatus therefore functions as a shock absorber. The liquid then passes through the radiating orifices 13 and fills the space between the element 10 and the cylinder 1. It would seem that under the effect of the shock there is merely a movement of the liquid without any alteration in the level or the relative position of the float member 18.

But the liquid displaced by the annular cross-section of the piston 10 must find space within the element 10 and, if the respective cross-sections of the float member 18 and of the tube 10 are for example in the ratio of 2:1, each centimetre by which the element 10 moves downwards relatively to the casing 11 will be accompanied by a relative ascent of five millimetres on the part of the float member 18 within the tube 10.

The air above the float member 18 will then be correspondingly compressed or supercompressed. It will be obvious that the effect on the pressure of a specific displacement of the piston 10a will be the greater in proportion as the capacity of the outside cylinder, in the case where such a cylinder is provided, is smaller relatively to the capacity of the upper chamber of the element 10 situated above the float member 18. The effect will be maximum if the cylinder is dispensed with (the case shown in Fig. 1).

The pressure of the liquid increases in accordance with a hyperbolic law as a function of the relative displacement of the element 10 in a downwards direction. The apparatus which is the subject of the invention has therefore the properties of a spring of variable flexibility.

When the piston 10a approaches the end of its stroke, the head 12 engages in the recess 3a. To the initial damping produced by the friction of the liquid in the orifice 15 and in the orifices 13, there is added the effect resulting from the imprisonment of the liquid between the crown 10c of the piston and the edge 5b of the plug. The only outlets for the liquid are the channels 26 formed in the head 12 along the generatrices with a gradually decreasing cross-section. It will be seen that by regulating the number and cross-section of the channels 26 it is possible to adjust the final braking and to avoid the crown 10c from coming into violent contact with the part 5b, with all the ensuing disadvantages.

When the overload effect caused by a shock (caused by the pavement or unevenness in the road) has ceased, the system tends under normal loading to resume its initial position owing to the action of the air compressed between the members 18 and 19.

At this moment the passage of the oil is facilitated by the deformation of the elastic diaphragm 25 which opens the orifices 14. The damping effect is therefore less, and the speed at which the apparatus returns to the balanced position is increased.

If owing to an abrupt unloading of the apparatus (when for example a wheel falls into a hole in the road) the system tends to become elongated in such manner that the piston 10a approaches the part 16, a braking system is provided at the top of the path of movement of the element 10 similar to that provided at the bottom path of movement of the element 10.

The liquid is compressed between the face 30 and the ring 16 and the edge of the piston 10a and has no other outlet than the channels 27 formed in the ring 16. This prevents any violent collision between the parts 10a and 16. At the upper limit the suspended wheel is strongly braked and strikes with very little force against the bottom of the hole which caused the disturbance.

What I claim is:

1. A suspension device for resiliently interconnecting two parts of a vehicle comprising, in combination, a cylindrical casing adapted to be connected to one part of the vehicle, a tubular member slidably received in said casing and adapted to be connected to the other part of the vehicle, a piston member connected with said slidable member and slidable against the inner wall of said cylindrical casing, said piston member having a hollow head provided with a central orifice of predetermined diameter providing communication between the interior of said slidable tubular member and the interior of said cylindrical casing on a first side of said piston member, said casing being adapted to be filled with a liquid and said slidable member being adapted to be at least partially filled by said liquid flowing through said orifice, a float member slidable interiorly of said slidable tubular member and engaging the inner wall of said slidable tubular member to prevent fluid communication from one side of said float member to the other, whereby to separate the interior of said slidable tubular member into two zones of variable volume, one of said zones being adapted to receive the liquid contained in said cylindrical casing and the other of said zones being adapted to contain a compressible fluid, the head of said piston member further comprising a plurality of channels providing communication between the interior of said slidable tubular member and the interior of said casing on said first side of said piston, said channels being provided with one-way valve means permitting flow of liquid from the interior of said slidable tubular member but preventing flow of liquid thereinto through said channels, and means providing continuous communication between the interior of said slidable member and the interior of said casing on the other side of said piston, the surface of said float facing said central orifice and said head being provided with cooperating abutment means to prevent interruption of communication through said head between said orifice, and said means providing continuous communication between the interior of said slidable member and the interior of said casing on the other side of said piston when said float moves toward said orifice.

2. A suspension device for resiliently interconnecting two parts of a vehicle comprising, in combination, a cylindrical casing adapted to be connected to one part of the vehicle, a tubular member slidably received in said casing and adapted to be connected to the other part of the vehicle, a piston member connected with said slidable member and slidable against the inner wall of said cylindrical casing, said piston member having a hollow head provided with a central orifice of predetermined diameter providing communication between the interior of said slidable tubular member and the interior of said cylindrical casing on a first side of said piston member, said casing being adapted to be filled with a liquid and said slidable member being adapted to be at least partially filled by said liquid flowing through said orifice, a float member slidable interiorly of said slidable tubular member and engaging the inner wall of said slidable tubular member to prevent fluid communication from one side of said float member to the other, whereby to separate the interior of said slidable tubular member into two zones of variable volume, one of said zones being adapted to receive the liquid contained in said cylindrical casing and the other of said zones being adapted to contain a compressible fluid, the head of said piston member further comprising a plurality of channels providing communication between the interior of said slidable tubular member and the interior of said casing on said first side of said piston, said channels being provided with one-way valve means permitting flow of liquid from the interior of said slidable tubular member but preventing flow of liquid thereinto through said channels, and means engaging with said piston at the lower end of the path of movement of said tubular member for gradually retarding the movement of the tubular member by progressively restricting the flow of liquid on each side of said piston as said tubular member approaches said lower end, and means engaging with said piston at the upper end of the path of movement of said tubular member for gradually retarding the movement of the tubular member at said upper end by progressively restricting the flow of liquid on each side of said piston as said tubular member approaches said upper end.

3. A suspension device for resiliently interconnecting two parts of a vehicle comprising, in combination, a cylindrical casing having a plug at one end and adapted to be connected to one part of the vehicle, a tubular member slidably received in said casing and adapted to be connected to the other part of the vehicle, a piston member connected with said slidable member and slidable against the inner wall of said cylindrical casing, said piston member having a hollow head provided with a central orifice of predetermined diameter providing communication between the interior of said slidable tubular member and the interior of said cylindrical casing on a first side of said piston member, said casing being adapted to be filled with a liquid and said slidable member being adapted to be at least partially filled by said liquid flowing through said orifice, a float member slidable interiorly of said slidable tubular member and engaging the inner wall of said slidable tubular member to prevent fluid communication from one side of said float member to the other, whereby to separate the interior of said slidable tubular member into two zones of variable volume, one of said zones being adapted to receive the liquid contained in said cylindrical casing and the other of said zones being adapted to contain a compressible fluid, the head of said piston member further comprising a plurality of channels providing communication between the interior of said slidable tubular member and the interior of said casing on said first side of said piston, said channels being provided with one-way valve means permitting flow of liquid from the interior of said slidable tubular member but preventing flow of liquid thereinto through said channels, a sleeve surrounding said slidable tubular member at the end of said casing away from said plug and said piston member being formed with an annular recess for at least partially receiving said sleeve, and said plug being formed with a recess for at least partially receiving said head, said head and said sleeve being provided with means for gradually retarding the movement of the tubular member at the ends of its path of movement.

4. A suspension device for resiliently interconnecting two parts of a vehicle comprising, in combination, a cylindrical casing having a plug at one end and adapted to be connected to one part of the vehicle, a tubular member slidably received in said casing and adapted to be connected to the other part of the vehicle, a piston member connected with said slidable member and slidable against the inner wall of said cylindrical casing, said piston member having a hollow head provided with a central orifice of predetermined diameter providing communication between the interior of said slidable tubular member and the interior of said cylindrical casing on a first side of said piston member, said casing being adapted to be filled with a liquid and said slidable member being adapted to be at least partially filled by said liquid flowing through said orifice, a float member slidable interiorly of said slidable tubular member and engaging the inner wall of said slidable tubular member to prevent fluid communication from one side of said float member to the other, whereby to separate the interior of said slidable tubular member into two zones of variable volume, one of said zones being adapted to receive the liquid contained in said cylindrical casing and the other of said zones being adapted to contain a compressible fluid, the head of said piston member further comprising a plurality of channels providing communication between the interior of said slidable tubular member and the interior of said casing on said first side of said piston, said channels being provided with one-way valve means permitting flow of liquid from the interior of said slidable tubular member but preventing flow of liquid thereinto through said channels, a sleeve surrounding said slidable tubular member at the end of said casing away from said plug and said piston member being formed with an annular recess for at least partially receiving said sleeve, and said plug being formed with a recess for at least partially receiving said head, said head and said sleeve being formed with grooves of gradually varying cross-section for gradually retarding the movement of the tubular member at the ends of its path of movement by restricting the flow of liquid from the recess in said plug and from the annular recess in said piston member.

5. A suspension device for resiliently interconnecting two parts of a vehicle comprising, in combination, a cylindrical casing adapted to be connected to one part of the vehicle, a tubular member slidably received in said casing and adapted to be connected to the other part of the vehicle, a piston member connected with said slidable member and slidable against the inner wall of said cylindrical casing, said piston member having a hollow head provided with a central orifice of predetermined diameter providing communication between the interior of said slidable tubular member and the interior of said cylindrical casing on a first side of said piston member, said casing being adapted to be filled with a liquid and said slidable member being adapted to be at least partially filled by said liquid flowing through said orifice, a float member slidable interiorly of said slidable tubular member and engaging the inner wall of said slidable tubular member to prevent fluid communication from one side of said float member to the other, whereby to separate the interior of said slidable tubular member into two zones of variable volume, one of said zones being adapted to receive the liquid contained in said cylindrical casing and the other of said zones being adapted to contain a compressible fluid, the head of said piston member further comprising a plurality of channels providing communication between the interior of said slidable tubular member and the interior of said casing on said first side of said piston, said channels being provided with one-way valve means permitting flow of liquid from the interior of said slidable tubular member but preventing flow of liquid thereinto through said channels, and means providing continuous communication between the interior of said slidable member and the interior of said casing on the other side of said piston, and fluid responsive sealing means between said casing and said tubular member, said sealing means including a packing and annular means holding said packing in seated position, said annular means being provided with a plurality of channels communicating with the interior of said casing to lead fluid from said casing into axially-directed engagement with said packing and into radial-directed engagement with said packing.

References Cited in the file of this patent

UNITED STATES PATENTS

| | | |
|---|---|---|
| 2,130,885 | Johnson | Sept. 20, 1938 |
| 2,146,089 | Onions | Feb. 7, 1939 |
| 2,227,261 | Johnson | Dec. 31, 1940 |
| 2,231,332 | Griepenstroh | Feb. 11, 1941 |
| 2,348,160 | Thornhill | May 2, 1944 |
| 2,372,137 | Thornhill | Mar. 20, 1945 |
| 2,616,687 | Butterfield | Nov. 4, 1952 |